United States Patent

[11] 3,628,395

| [72] | Inventor | Herman J. Maurer<br>Terre Haute, Ind. |
|---|---|---|
| [21] | Appl. No. | 874,493 |
| [22] | Filed | Nov. 6, 1969 |
| [45] | Patented | Dec. 21, 1971 |
| [73] | Assignee | J. I. Case Company |

[54] TRANSMISSION CONTROL MECHANISM
11 Claims, 3 Drawing Figs.

[52] U.S. Cl. .................................................. 74/473 R,
74/484
[51] Int. Cl. ..................................................... G05g 9/02
[50] Field of Search .......................................... 74/485,
487, 484, 473, 475, 476, 477, 473 SW, 486

[56] References Cited
UNITED STATES PATENTS
2,497,930  2/1950  Creson ........................ 74/484 X
2,861,465  11/1958  Winkle et al. .................. 74/484 X
3,452,961  7/1969  Forsman ....................... 74/105 X

*Primary Examiner*—Milton Kaufman
*Attorney*—Dressler, Goldsmith, Clement & Gordon ABSTRACT: A control mechanism for shifting a pair of control devices forming part of the transmission of a vehicle. The control mechanism includes a shift lever which is rotatable about its own longitudinal axis and which is pivotable about an axis perpendicular to its own axis with the respective movements transmitted to two control devices forming part of a vehicle transmission. The dual motion of the shift lever is transmitted through a single control rod connected at one end to the shift lever and at the opposite end to the respective control devices. The connections to the control devices incorporate mechanism which transmits only the rotary motion of the rod to one of the control devices and the axial shifting of the control rod to the other of the devices.

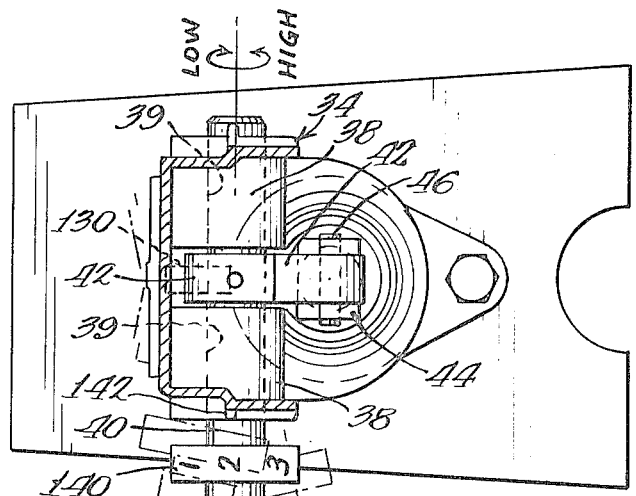
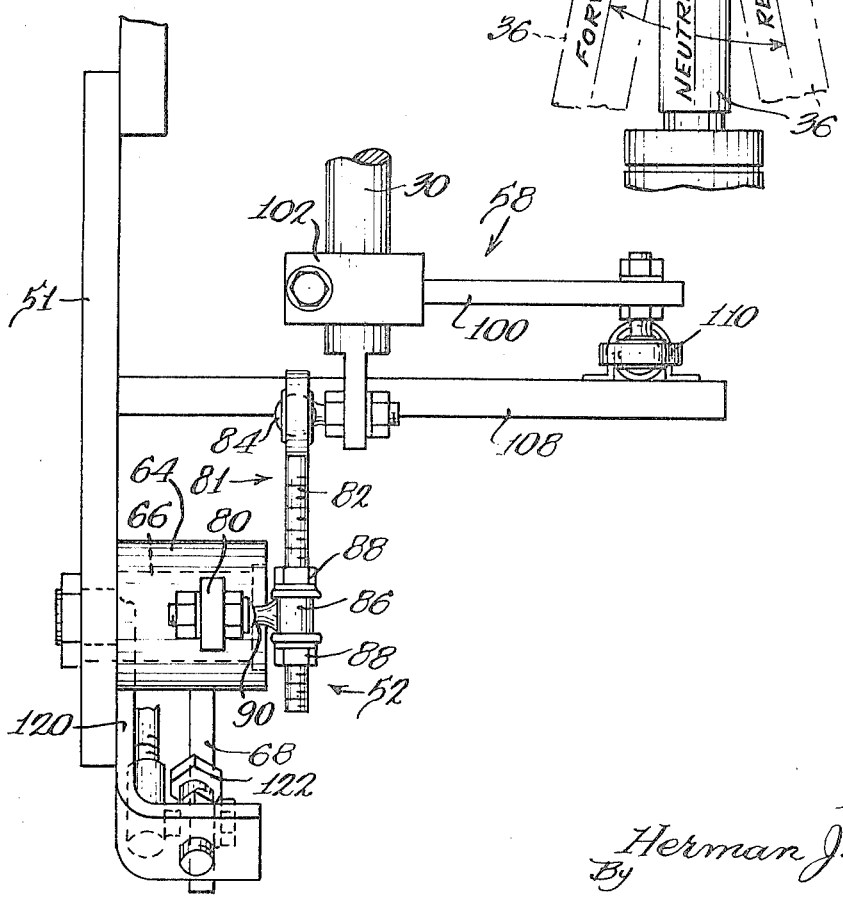
Fig. 2.
Fig. 3.
Inventor:
Herman J. Maurer
By
Dressler, Goldsmith, Clement & Gordon
Atty's 3,628,395

TRANSMISSION CONTROL MECHANISM

BACKGROUND OF THE INVENTION

The present invention relates generally to transmission control devices and more particularly to an improved motion-transmitting mechanism for transmitting the dual movements of a single control lever to two operated devices in the transmission.

The use of a single shift lever or control handle for moving two devices in a transmission has been known for many years. Generally, such single control handle is supported for movement in two different directions, rotational movement about its own longitudinal axis and pivotal or swinging movement about an axis perpendicular thereto. Control mechanisms incorporating such an arrangement are disclosed in Creson U.S. Pat. No. 2,497,930; Winkle et al. U.S. Pat. No. 2,861,465; and Day et al. U.S. Pat. No. 3,417,635.

However, in all of these control devices, the dual motion of the shift lever or control handle incorporates complicated mechanism for transmitting the dual motion of the shift lever to the control devices. Thus, in the above mentioned patents, the dual motion of the shift lever is transmitted through two completely separate and isolated motion-transmitting means which are connected to the shift lever. In each instance, the motion-transmitting means of the above control mechanisms incorporates a hollow tube supporting an axially shiftable rod therein with the two members having connections at one end to the shift lever and at the opposite end to the respective control devices in the transmission.

Such an arrangement requires that the hollow shaft and the rod be maintained in accurate alignment with each other to allow relative movement of the two members. Such a requirement is difficult to maintain particularly when the transmission is located a considerable distance from the shift lever, normally supported adjacent the steering wheel for the vehicle.

SUMMARY OF THE INVENTION

The present invention contemplates transmitting the dual motion of a single control lever for moving two control devices of a transmission through a single motion-transmitting member. In the illustrated embodiment of the present invention, the motion-transmitting member is in the form of a control rod having a linkage connection at one end to the shift lever with the shift lever being supported for swinging motion about the axis of the control rod and for rotational movement about its own longitudinal axis. The swinging and rotational movement of the shift lever respectively rotate and axially shift the control rod relative to its own axis. The free end of the single control rod is connected through a first motion-transmitting linkage to one of the shifting devices for shifting said device in response to axial movement of the control rod but accommodating rotational movement of the control rod without shifting said device. The free end of the control rod further includes a second motion-transmitting linkage connected to a second shifting device for transmitting the rotational movement of the control rod to said device and accommodating axial shifting of the control rod without effecting the position of the second shifting device.

Considered in more detail, the first motion-transmitting means is in the form of an arm extending radially from the control rod and fixed thereto with the free ends universally connected to a flexible cable having its opposite end connected to the shifting device of the transmission. The second motion-transmitting linkage or means includes a bellcrank pivoted about an axis transverse to the axis of the control rod and coupling means connecting one arm of the bellcrank to the control rod with the coupling means permitting independent rotation of the control rod relative to the bellcrank and pivoting the bellcrank in response to axial shifting of the control rod. The opposite end arm of the bellcrank is connected through an elongated member to the second shifting device of the transmission.

BRIEF DESCRIPTION OF THE SEVERAL VIEWS OF DRAWINGS

FIG. 2 is a view taken generally along lines 2—2 of FIG. 1 showing the linkage connection on the free end of the control rod; and FIG. 3 is an end view of the control mechanism viewed generally along lines 3—3 of FIG. 1.

DETAILED DESCRIPTION

Figure 1:
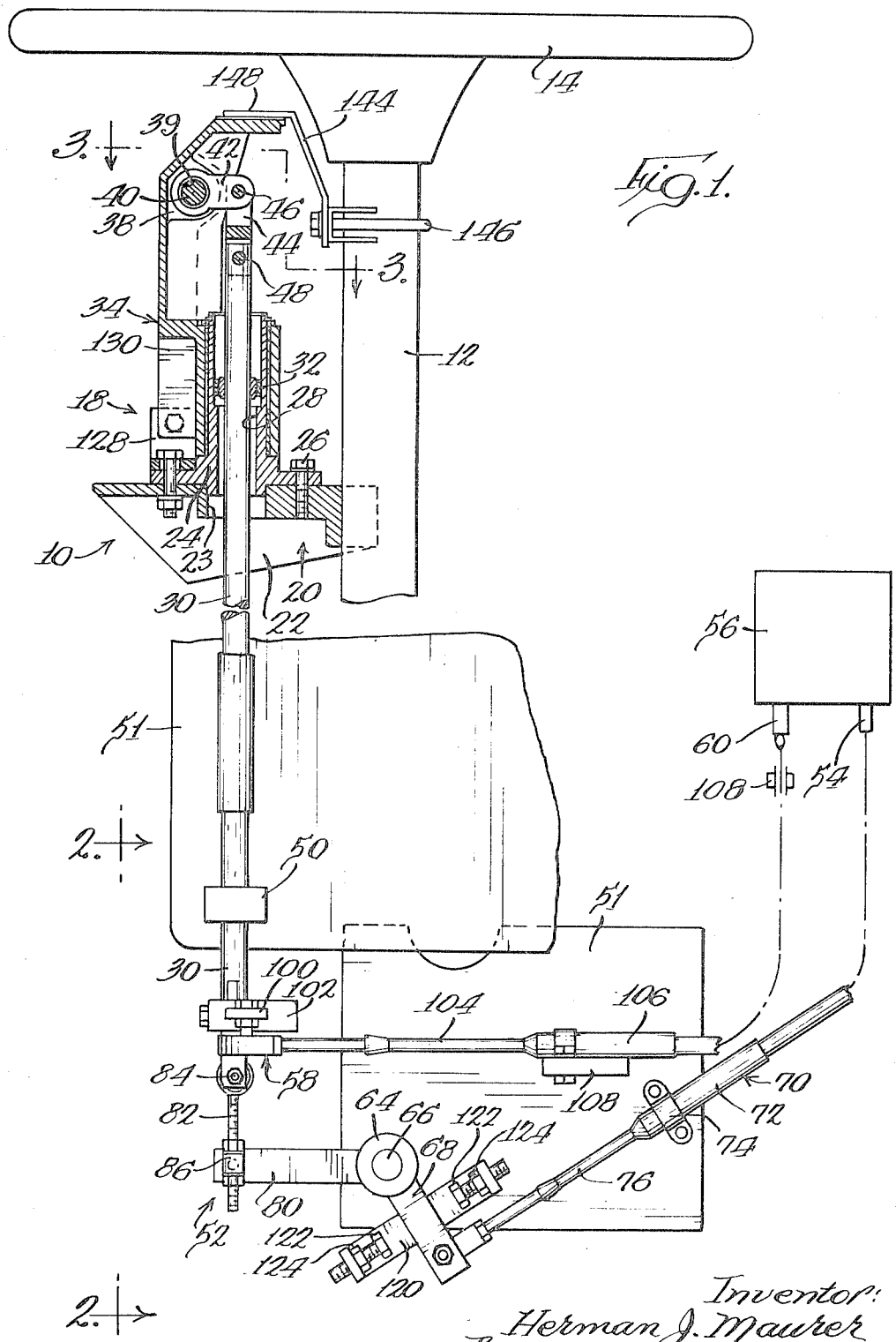
FIG. 1 is a side elevational view, partly in section, of the control mechanism of the present invention.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

FIG. 1 of the drawing discloses the transmission control mechanism 10, constructed in accordance with the present invention, supported on the column 12 for the steering wheel 14 of a vehicle (not shown). The control mechanism 10 includes a control lever assembly 18 supported adjacent the upper edge of the steering column 12 by bracket means 20. The bracket means 20 includes a member 22 fixed to the steering column 12 and having an opening 23 therein. The member 22 has a hub 24 fixedly secured thereto by bolts 26 with the hub defining a central bore 28 for a control rod 30. The control rod is supported in the bore 28 by a bearing 32 so as to be axially shiftable and rotatable within the bore.

The bracket means 20 also has a member 34 rotatably supported on the hub 24 so as to be rotatable about the axis of the bore 28 as well as the axis of the control rod 30. The hollow member 34 defines support means for a shift lever or control handle 36 and supports the shift lever for pivotal movement about the axis of the control rod as well as rotational movement about its own longitudinal axis.

For this purpose, the hollow member or support means 34 has spaced lugs 38 adjacent the upper inner end thereof with each lug 38 having an opening 39 therein for rotatably supporting the inner end 40 of the shift lever 36. As shown in FIGS. 1 and 2, the axes of the openings 39 are aligned and laterally offset and extend transversely of the axis of the bore 28 as well as the axis of the control rod 30. Also, the openings 39 are of substantially the same size as the size of the inner end of the shift lever or control handle 36. Thus, the shift lever 36 is supported for rotational movement upon its own longitudinal axis and the support means or bracket 34 supports the shift lever for pivotal movement about the axis of the control rod 30.

The inner end 40 of the shift lever 36 is connected to one end of the control rod for rotating the control rod in response to pivotal movement of the lever 36 and for axially shifting the control rod 30 in response to rotational movement of the shift lever within the openings 39. The connection between the shift lever and control rod includes linkage means in the form of an arm 42 fixedly secured to the inner end 40 of the shift lever 36 between the lugs 38 and extending radially therefrom. The free end of the arm or link 42 is pivotally connected to a second link 44, the free end of which is pivotally connected to the end of the control rod. The link 44 is illustrated as a substantially H-shaped member receiving the link 42 between the legs thereof at the upper end and pivotally interconnected by a pin 46. The lower ends of the legs of the H-shaped member 44 extend on opposite sides of the control rod 30 and are pivotally connected thereto by a second pin 48. Thus, the link 44 is limited to pivotal movement in a plane extending through the axis of the control rod 30.

It will be appreciated that rotational movement of the shift lever or control handle 36 about its own longitudinal axis will rotate the arm 42 about the axis of the opening 39 and cause an axial shifting of the control rod 30. Also, swinging movement of the shift lever in a plane perpendicular to the axis of the control rod 30 will cause a rotational movement of the support means 34 about the axis of the control rod 30 and the linkage means including links 42 and 44 will define a fixed connection between the control rod 30 and the shift lever 36. Thus, swinging movement of the shift lever will rotate the control rod 30 about its own longitudinal axis.

The control rod 30 is further supported by second bracket means 50 spaced from the first bracket means 22 with the bracket means 50 being fixedly secured to a support 51 forming part of the vehicle. Again, the control rod 30 is adapted to be axially shiftable and rotatable relative to the second bracket means 50.

According to the invention, the opposite end of the control rod 30 is connected through first motion-transmitting linkage means 52 to a first shifting device or speed control member 54 of a transmission 56 and through second motion-transmitting means 58 to a second shifting device or direction control member 60 of the transmission 56.

The first motion-transmitting means 52 includes a bellcrank having its hub 64 pivotally supported by a bolt 66 extending from the plate 51. One arm 58 of the bellcrank is connected through a Bowden wire 70 to the first shifting device 54 which controls the speed range of the transmission. The Bowden wire includes a sheath 72 supported by spaced brackets 74 (only one being shown) with an elongated member or cable 76 axially shiftable within the sheath 72. Of course, the opposite ends of the cable 76 are respectively connected to the arm 68 and the shifting device 54. The second arm 80 of the bellcrank is connected through coupling means 81 to the free end of the control rod 30.

The coupling means 81 includes a link 82 having a ball-and-socket connection at 84 to one end of the control rod 30. The opposite end of the link 82 has a member 86 pivotally supported thereon and limited to rotational movement about the axis of the link 82 by a pair of nuts 88 threadedly received on the link 82. The free end of the arm or member 86 is connected by a second ball-and-socket connection 90 to the second arm 80 of the bellcrank. Thus, it will be appreciated that the coupling means interconnecting the arm 80 and the control rod 30 includes first and second universal connections respectively defined by the ball-and-socket connections 84 and 90 and will pivot the bellcrank about the bolt 66 in response to axial shifting of the control rod. However, the coupling means 81 will permit independent rotation of the control rod relative to the bellcrank.

The second motion-transmitting linkage means includes an arm 100 having one end fixedly secured by a coupling 102 adjacent the free end of the control rod 30. The arm 100 extends radially from the control rod and has its free end connected to the second shifting device 60. The connection between the free end of the arm 100 and the second shifting device 60 again includes a flexible cable 104 axially shiftable within a sheath or housing 106 which is fixedly secured at opposite ends by brackets 108. The interconnection between the end of the cable 104 and the arm 100 again includes a ball-and-socket connection 110 which permits independent axial shifting of the arm 100 and the control rod 30 relative to the shifting device 60 and transmits only the rotational movement of the control rod 30 to the second shifting device 60.

It is also desirable to have mechanism for limiting the axial movement of the respective cables 76 and 104. In the illustrated embodiment, the means for limiting the axial shifting of the cable 76 to define the extreme positions of the shifting device 54 includes a U-shaped bracket 120 fixed to the plate 51 and having its legs extending on opposite sides of the arm 68. Each leg of the bracket 120 has a threaded opening therein for threadedly receiving adjustable stop means in the form of a bolt 122 maintained in adjusted position by a lock nut 124. Thus, the heads of the bolts 122 will define the extreme positions of the bellcrank, as well as the cable 76.

The stop means for defining the extreme positions of the control cable 104 is likewise a U-shaped bracket 128 extending on opposite sides of a portion 130 of the support means 34 to limit the rotational movement of the support means to two extreme positions thereby limiting the rotational movement of the control rod 30 and the axial shifting of the control cable 104.

It is also desirable to provide indicia for indicating the position of the respective control devices. For this purpose, the shift lever 34 has a collar 140 supported thereon with numbers indicating the speed range of 1 for low; 2 for intermediate; and 3 for the high range for the transmission. A projection 142 extends from the support member 34 to indicate the speed position of the transmission. It should be noted that the transmission may be shifted from the low through the intermediate to the high-speed range by rotating the shift lever 90° which may be accomplished without releasing and regrasping the shift lever 36.

The direction control indicator includes a plate 144 secured to the steering column 12 by a clamp 146 and having a portion 148 overlying the upper end of the support member 34. Suitable indicators may be provided on the surface of the support member or the overlying portion 148 to indicate the position of the direction control device 60. The shifting of the direction control device between forward and reverse may be accomplished by swinging the control lever 36 through an arc of approximately 20°.

It is believed that the operation of the present control mechanism is apparent from the above description. However, for purpose of completeness applicant will briefly describe the operation. Preferably, rotation of the shift lever or control handle controls the speed of the transmission while pivotal movement of the shift lever controls the direction of movement of the vehicle having the transmission 56 therein.

In the position illustrated in the solid lines in the drawings, the transmission direction control shifting device or valve spool 60 is in the neutral position while the speed range shifting device or valve spool 54 is in the intermediate position. Thus, rotation of the shift lever about its own longitudinal axis in one direction or clockwise as viewed in FIG. 1, will change the speed of the transmission from the intermediate range to the low range and rotation in a counterclockwise direction, as viewed in FIG. 1, will shift the transmission to the high-speed range. By way of example, the rotation required in either direction from the intermediate position is approximately 45°. During such rotational movement of the shift lever 36, the ball-and-socket connection 110 between the end of the cable 104 and the arm 100 will accommodate relative movement between the link and the cable and will maintain the valve spool 60 in the selected position.

If it is desired to engage the transmission in either the forward or reverse direction, the control handle or shift lever 36 is pivoted to the left or right of the solid line position to the dotted line positions shown in FIG. 3. During such pivotal movement of the shift lever, the linkage means, including links 42 and 44 will maintain a fixed relationship between the end of the shift lever and the control rod 30 so as to rotate the control rod about its own longitudinal axis. Such rotation of the control rod about its own longitudinal axis will be transmitted through the transmitting linkage including arm 100 and cable 104 to thereby move the valve spool 60. During such rotational movement of the control rod 30, the two universal connections 84 and 90 will cooperate to maintain the bellcrank forming part of the other motion-transmitting mechanism in its predetermined position.

Thus, it will be appreciated that the control of either of the valve spools 54 or 60 may be accomplished without effecting the position of the other of the valve spools. Such arrangement is highly desirable in cases where the operator wishes to maintain a same speed relationship and continually shift the transmission in either the forward and reverse directions.

What is claimed is:

1. In combination with a vehicle transmission having first and second shifting devices respectively actuable for controlling the speed and direction of a vehicle, a control mechanism comprising a bracket having a bore therein;

a single control rod axially shiftable and rotatable in said bore;

a shift lever; means connecting said shift lever to one end of said control rod; means on said bracket supporting said shift lever for pivotal movement to rotate said control rod and for rotation about its own longitudinal axis to axially shift said control rod;

first means connecting the opposite end of said control rod to said first device and movable only in response to axial shifting of said control rod; and second means connecting the opposite end of said control rod to said second device and movable only in response to rotational movement of said control rod whereby rotation and pivoting of said shift lever are transmitted to the respective devices through said single control rod, said first means including a link having a universal connection at one end to said control rod and connection means between the opposite end of said link and said first control device, said connection means including a universal connection, said universal connections cooperating to permit independent rotation of said control rod relative to said first device.

2. The combination as defined in claim 1, in which said connection means includes a bellcrank having one arm operatively connected to said link and another arm operatively connected to said first device, said bellcrank being pivoted about an axis transverse to the axis of said control rod.

3. The combination as defined in claim 1, in which said second means includes an arm fixed to said control rod and extending radially therefrom; and a flexible cable having one end connected to the free end of said arm and the opposite end connected to said second device, said connections accommodating axial shifting of said control rod without shifting of said second device.

4. The combination as defined in claim 1, in which said means supporting said shift lever includes a member supported for rotation on said bracket about the axis of said bore, said member having an opening laterally offset from the axis of said bore and receiving said shift lever for rotation therein, said member being rotated about said bore axis upon pivotal movement of said shift lever to rotate said control rod.

5. The combination as defined in claim 1, in which said first connecting means includes a flexible cable axially shiftable in a sheath, said sheath being supported at opposite ends; and in which said universal connection includes a ball-and-socket operatively connecting said cable to said control rod, said ball-and-socket accommodating rotational movement between said control rod and cable.

6. A control mechanism for manually controlling the direction and speed of movement of a vehicle transmission comprising:

a single control rod;

spaced bracket means supporting said control rod for axial and rotational movement;

a shift lever;

support means adjacent one end of said control rod for supporting said lever to pivot about the axis of said control rod and rotate about its own longitudinal axis;

linkage means interconnecting said control rod and lever to axially move said rod in response to rotation of said lever and rotate said rod in response to pivoting of said lever;

first motion-transmitting linkage connected adjacent the opposite end of said control rod for transmitting said axial movement to a first shifting device; and second motion-transmitting linkage connected adjacent said opposite end of said control rod for transmitting said rotational movement to a second shifting device said second motion-transmitting linkage comprises an arm extending transversely of the axis of said control rod, said arm having one end fixed to said control rod and its opposite end operatively connected to said second shifting device.

7. A control mechanism as defined in claim 6, in which said support means comprises a member rotatable about the axis of said rod; means defining an opening having an axis laterally offset and angularly related to the control rod axis, said member rotatably supporting said shift lever in said opening; and linkage means operatively interconnecting the adjacent ends of said shift lever and said control rod.

8. A control mechanism as defined in claim 6, in which said first motion-transmitting linkage includes, a bellcrank pivoted about an axis extending substantially transversely to the axis of said control rod; means operatively connecting one arm of said bellcrank to said second shifting device; and coupling means operatively connecting the opposite arm of said bellcrank to said control rod, said coupling means permitting independent rotation of said control rod relative to said bellcrank and pivoting said bellcrank in response to axial shifting of said control rod.

9. A control mechanism as defined in claim 8, in which said coupling means comprises a link having opposite ends and universal connections respectively connecting said ends to said control rod and said opposite arm of said bellcrank.

10. A control mechanism as defined in claim 6, in which said second motion-transmitting means includes an elongated member having a first connection at one end to said second shifting device and a second connection means at its opposite end to said control rod, said second connection permitting axial movement of said control rod relative to said elongated member.

11. A control mechanism for manually controlling the direction and speed of movement of a vehicle transmission comprising:

a single control rod;

spaced bracket means supporting said control rod for axial and rotational movement;

a shift lever;

support means adjacent one end of said control rod for supporting said lever to pivot about the axis of said control rod and rotate about its own longitudinal axis;

linkage means interconnecting said control rod and lever to axially move said rod in response to rotation of said lever and rotate said rod in response to pivoting of said lever;

first motion-transmitting linkage connected adjacent the opposite end of said control rod for transmitting said axial movement to a first shifting device; and second motion-transmitting linkage connected adjacent said opposite end of said control rod for transmitting said rotational movement to a second shifting device said second motion-transmitting linkage comprises an arm extending transversely of the axis of said control rod, and arm having one end fixed to said control rod and its opposite end operatively connected to said second shifting device, one of said bracket means includes a hub having a bore receiving said control rod;

said support means includes a member rotatable on said hub and having an opening laterally offset and extending transversely of the rotational axis of said member, said lever extending through said opening and having an arm extending radially from the inner end thereof; and a link having opposite ends respectively pivoted to said arm and said control rod to pivot in a plane parallel to the axis of said control rod;

said second motion-transmitting means includes a fixed arm extending radially of said control rod and having its free end operatively universally connected to said first shifting device; and said first motion-transmitting linkage includes a bellcrank pivoted on an axis transverse to the axis of said control rod and having first and second arms; said first arm operatively connected to said second shifting device; and a link having a universal connection at one end to said control rod and a universal connection at its opposite end to said second arm;

whereby pivotal movement of said shift lever will shift said first device by rotation of said control rod and rotational movement of said shift lever will shift said second device by axial shifting of said control rod and either of said devices may be shifted while the other of said devices is in any position.

* * * * *